United States Patent [19]

Machida et al.

[11] Patent Number: 5,453,789
[45] Date of Patent: Sep. 26, 1995

[54] MOVING-IMAGE SIGNAL ENCODING APPARATUS

[75] Inventors: Yutaka Machida; Takeshi Yukitake, both of Yokohama, Japan

[73] Assignee: Matsushita Electric Industrial Co., Ltd., Osaka, Japan

[21] Appl. No.: 8,585

[22] Filed: Jan. 25, 1993

[30] Foreign Application Priority Data

Jan. 30, 1992 [JP] Japan .................................. 4-014536

[51] Int. Cl.$^6$ .............................. H04N 7/12; H04N 7/32
[52] U.S. Cl. ........................... 348/400; 348/401; 348/420
[58] Field of Search ...................... 358/133, 135, 358/136, 140, 141, 142, 11, 12, 13, 426, 261.1, 261.2, 261.3, 427, 430; 341/94, 95, 87, 155; 348/390, 400–408, 409, 410, 411–420, 469, 471, 472; H04N 7/12, 7/00, 7/04

[56] References Cited

U.S. PATENT DOCUMENTS

| | | | |
|---|---|---|---|
| 4,467,335 | 8/1984 | Eby, Jr. et al. | 358/135 |
| 4,630,030 | 12/1986 | Roy | 341/95 |
| 4,713,676 | 12/1987 | Ishikawa et al. | 358/135 |
| 4,751,742 | 6/1988 | Meeker | 358/135 |
| 4,759,038 | 7/1988 | Takahashi et al. | 358/135 |
| 5,111,292 | 5/1992 | Kuriacose et al. | 358/133 |
| 5,121,202 | 6/1992 | Tanoi | 358/133 |

FOREIGN PATENT DOCUMENTS

| | | |
|---|---|---|
| 0309280 | 3/1989 | European Pat. Off. . |
| 0441168 | 8/1991 | European Pat. Off. . |
| 2272851 | 11/1990 | Japan . |
| 3141752 | 6/1991 | Japan . |
| 3136595 | 6/1991 | Japan . |
| 3198431 | 8/1991 | Japan . |
| 8914843 | 6/1989 | United Kingdom . |

OTHER PUBLICATIONS

Signal Processing Image Communication. Elsevier Science Publishers B.V., vol. 3, No. 4, Dt. Sep. 1, 1991, "A Video Coding Method Considering Cell Losses in ATM-based Networks", H. Tominaga et al. pp. 291–300.

Optical Engineering, vol. 28, No. 7, Dt. Jul. 1, 1989, "Asynchronous Transfer Mode Packet Video Transmission System", H. J. Chao et al., pp. 781–788.

Primary Examiner—James J. Groody
Assistant Examiner—Michael H. Lee
Attorney, Agent, or Firm—Spencer, Frank & Schneider; Christopher H. Lynt

[57] ABSTRACT

A moving-image signal encoding apparatus is provided in which information to be lost is suppressed to a minimum extent when a cell is lost in a transmission line. A cell assembler divides a bitstream into cells of bits and adds to the cells positional information of encoded words having particular meaning within the cell. When the cells are lost in the transmission line, a decoding is allowed from the encoded words having particular meaning which appears at a first bit of bitstream succeeding to the lost cells.

6 Claims, 4 Drawing Sheets

MOVING-IMAGE SIGNAL ENCODING APPARATUS

BACKGROUND OF THE INVENTION

This invention relates to a moving-image signal encoding apparatus which is used in video telephone and teleconference.

In general, the moving image signal has large spatial and temporal correlation. The conventional moving-image signal encoding apparatus calculates predicted error value for each pixel by making intraframe prediction and interframe prediction with motion compensation, and removes the correlation existing between the pixels. The moving image signal with the correlation removed has a narrow dynamic range, and takes particular values at a high frequency. If a proper variable length code (for example, huffman code) is assigned to the particular values which occur at a high frequency, the moving image signal can be coded to have a small amount of information.

FIG. 1 is a block diagram of the conventional encoding apparatus for the moving image signal. Referring to FIG. 1, when a digital moving-image signal is applied to an input terminal 101, a motion vector detector 102 detects a motion vector for each block which is a group of a plurality of pixels (for example, 8×8 pixels) by use of the reproduced pixel value of the previous frame read from a frame memory 103. A prediction circuit 104 receives the motion vector and the reproduced pixel value of the previous frame read from the frame memory 103, and makes interframe prediction with motion compensation, thereby calculating a predicted value. A subtracter 105 subtracts the predicted value from the digital moving-image signal supplied via the input terminal 101 to produce a prediction error value. An encoding circuit 106 encodes the prediction error value at each block and supplies this prediction error value code to an information source encoding circuit 107. The information source encoding circuit 107 receives positional information of the block within the current frame from a block position information generator 108, the motion vector of the block from the motion vector detector 102, and the prediction error value code from the encoding circuit 106, and makes optimum information source encoding according to the appearance probabilities of these values to produce a variable length code. A buffer 109 converts the variable length code into a bitstream. A channel encoding circuit 110 divides the bitstream into units of a plurality of bits each and produces them as cells on a transmission path 111. On the other hand, a decoder 112 locally decodes the prediction error value code produced from the encoding circuit 106, thus reproducing the prediction error value. In addition, an adder 113 adds this reproduced prediction error value and the predicted value from the prediction circuit 104, thus reproducing the pixel value. This pixel value is written in the frame memory 103.

Therefore, according to this conventional example, the moving image can be encoded to have a small amount of information. In addition, by converting the transmitted information into cells, it is possible to efficiently transmit the moving image at a variable rate.

In the conventional moving-image signal encoding apparatus, however, if a cell is lost on the transmission path, part of the corresponding bitstream is also lost. Thus, since the bitstream is a sequence of variable length codes, the code word included in the bitstream following the lost cell cannot be correctly decoded. In addition, information is lost in the bitstream following the lost cell until the unique code word which can always be recognized appears.

SUMMARY OF THE INVENTION

Accordingly, it is an object of the invention to provide a moving-image signal encoding apparatus in which, when a cell is lost in the transmission path, the lost information can be restricted to the minimum.

According to this invention, to achieve the above object, there is provided a moving-image signal encoding apparatus which is so arranged that the positional information having a plurality of bits which indicates the position of a particular-meaning carrying code word of the bitstream contained in a cell is added to this cell and that the information indicating whether or not the positional information of the particular-meaning carrying code word is added to the cell is added to the cell, thereby enabling the presence or absence of the positional information to be recognized for each cell.

Therefore, according to this invention, since the positional information of a certain-meaning carrying code word is added to the cells, even if a cell is lost in the transmission path, it can be decoded from a particular-meaning carrying code word which first appears in the bitstream following the lost cell, thus the lost information being suppressed to the minimum. In addition, since the positional information of a certain-meaning carrying codeword is not added to the cells in the transmission path in which no cell is lost, but only the information that the positional information is not added to the cells is added to within the cells, the transmission efficiency can be prevented from being reduced.

DESCRIPTION OF THE PREFERRED EMBODIMENTS

Embodiment 1

Figure 1:
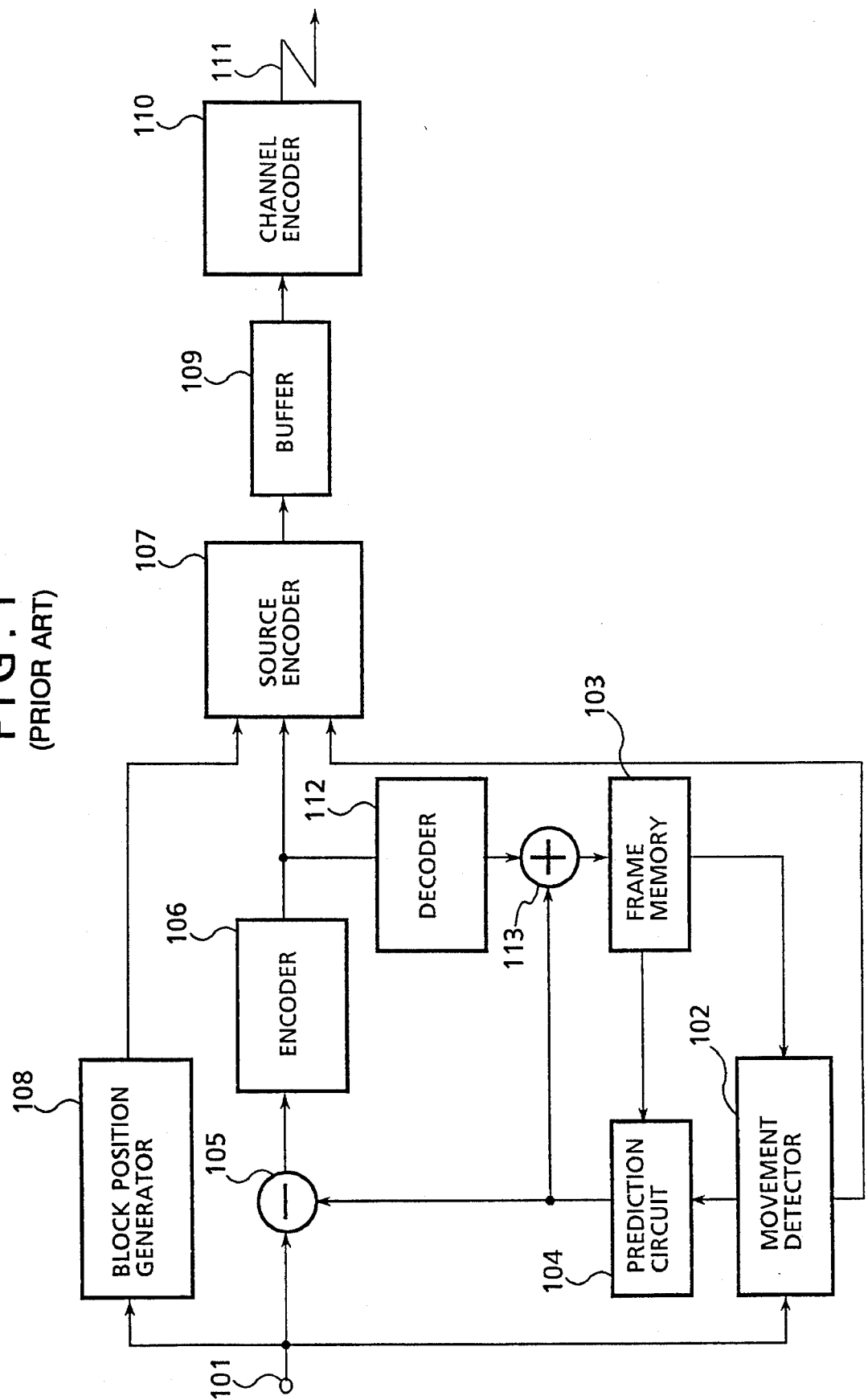
FIG. 1 is a schematic block diagram of the conventional moving-image signal encoding apparatus.
Figure 2:
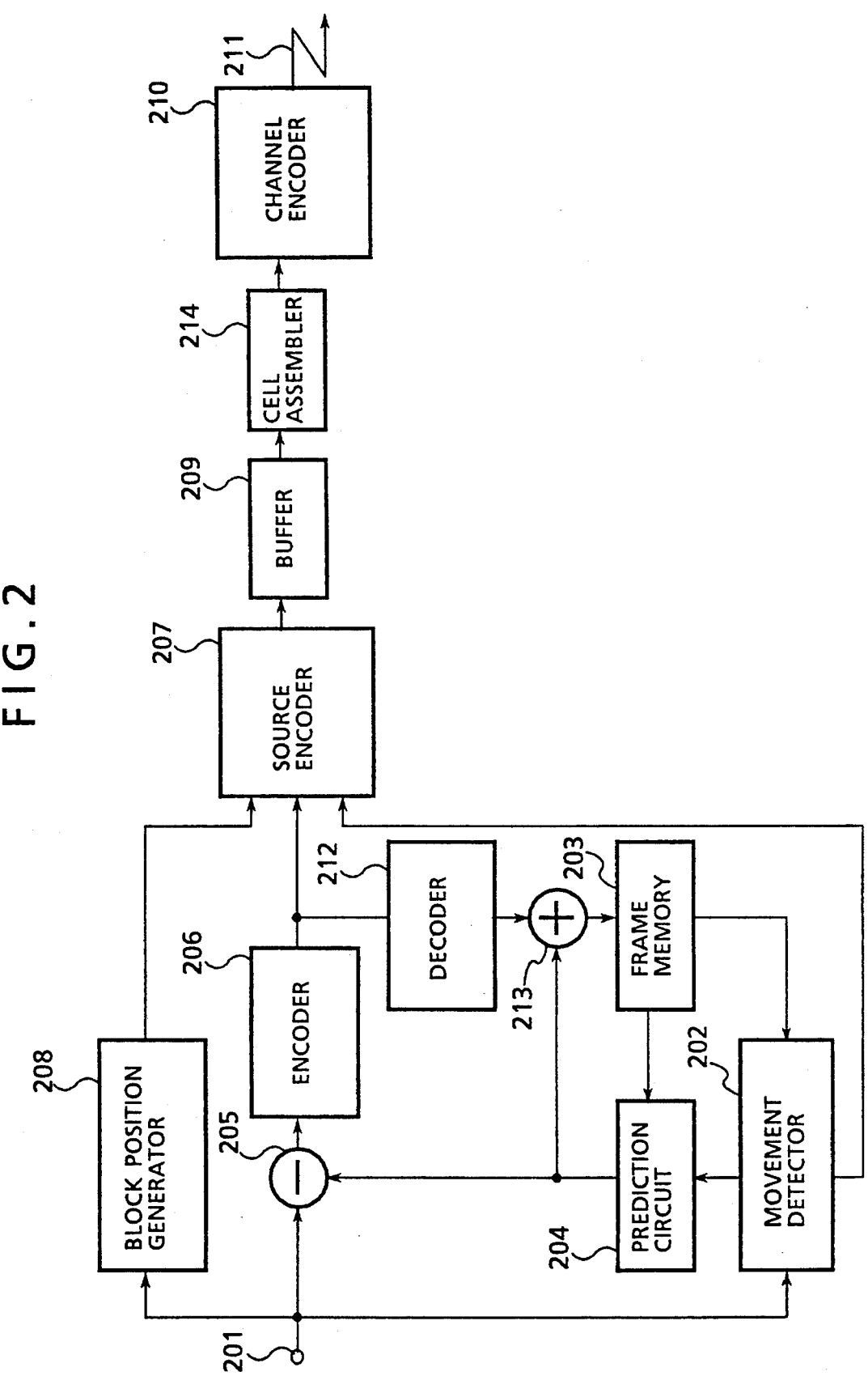
FIG. 2 is a schematic block diagram of one embodiment of the moving-image signal encoding apparatus of the invention.
Figure 3:
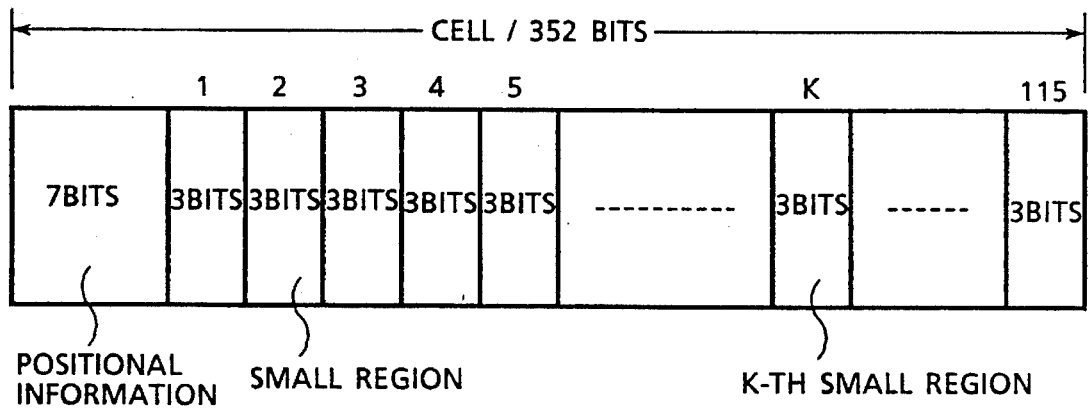
FIG. 3 is an explanatory diagram to which reference is made in explaining the operation of a cell assembler in the first embodiment of the invention.
Figure 4:
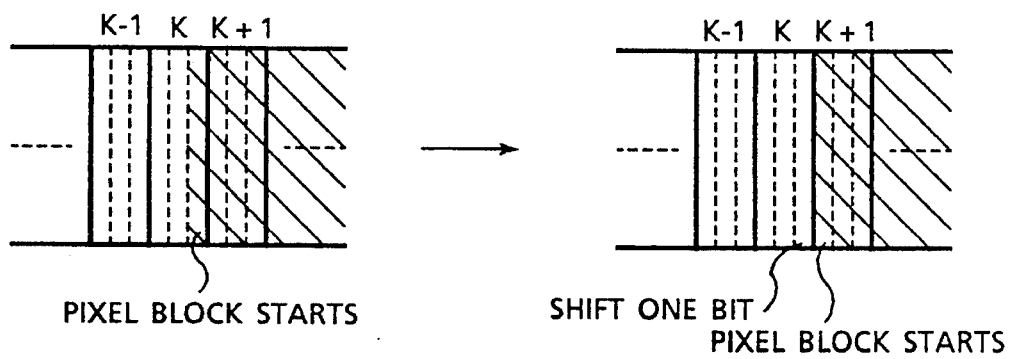
FIG. 4 is an explanatory diagram to which reference is made in explaining the operation of the cell assembler in the first embodiment of the invention.

Embodiments of the invention will be described with reference to the accompanying drawings. FIG. 2 is a block diagram of a first embodiment of the moving-image signal encoding apparatus of the invention. FIGS. 3 and 4 are diagrams to which reference is made in explaining the operation of the encoding apparatus shown in FIG. 2.

The operation of the first embodiment will be described below. Referring to FIG. 2, when a digital moving-image signal is supplied to an input terminal 201, a motion vector detection circuit 202 detects a motion vector of each block which is formed of a group of a plurality of pixels (for example, 8×8 pixels) by use of the reproduced pixel values of the previous frame read from a frame memory 203. A prediction circuit 204 makes interframe prediction with motion compensation and calculates predicted values by use of the motion vector and the reproduced pixel values of the previous frame read from the frame memory 203. A subtracter 205 subtracts the predicted value from the input digital moving-image signal at the input terminal 201, thus producing a prediction error value. An encoding circuit 206 encodes the input prediction error value into a code at each block, and supplies it to an information source encoding circuit 207. The information source encoding circuit 207 receives the positional information of the block within the current frame from a block position information generating circuit 208, the motion vector of this block from the motion vector detection circuit 202, and the code of the prediction error value from the encoding circuit 206, and makes optimum information source encoding in accordance with the appearance probabilities of these information so as to produce a variable length code. A buffer 209 converts the variable length code into a bitstream. A cell assembler 214 divides the bitstream into cells of bits each, divides each cell into a plurality of small regions, and adds to within each cell the positional information indicating the small region from which the information of a certain pixel block begins. A channel encoding circuit 210 produces cells on a transmission path. The code of the prediction error value produced from the encoding circuit 206 is locally decoded by a decoding circuit 212. An adder 213 adds this reproduced prediction error value and the predicted value from the prediction circuit 204, and thus produces a pixel value, which is written in the frame memory 203.

The operation of the cell assembler 214 in the first embodiment will be described with reference to FIG. 3. The bitstream produced from the buffer 209 is divided into cells of, for example, 352 bits each by the cell assembler 214. Of the 352 bits, for example the first seven bits indicate the positional information, and the remaining 345 bits constitute the bitstream. At the same time, the cell assembler 214 divides the 345-bit bitstream into 115 small regions of, for example, 3 bits, and assigns numbers such as 1, 2, . . . 115 to the small regions, respectively. When information of a certain pixel block begins from the K-th small region of a certain cell, K is expressed by a binary value of seven bits and added to the beginning of the corresponding cell as the positional information. In this case, it is assumed that the information of a certain pixel block begins from the first bit of the K-th small region. If the information of a certain pixel block begins from another bit than the first bit of the K-th small region, a bit of, for example, 1 is added thereat, as shown in FIG. 4, shifting one bit so that the information of a certain pixel block begins from the first bit of the (K+1)-th small region. Such bit shifting is performed so that the information of pixel block corresponds to the first bit of the region. Then, since this pixel block information contains the positional information of the pixel block within the frame, it can be decoded from the same pixel block. When there are two or more pixel blocks within one cell, the number of the small region in which the pixel block information begins and which is closer to the beginning of the cell is added to the beginning of the cell.

Therefore, according to the first embodiment, since the number of the small region in which the information of a certain pixel block begins is added to the beginning of the cell as the positional information, the bitstream following the cell lost in the transmission path can be decoded beginning with the first appearing pixel block. Thus, the loss of information can be minimized.

Embodiment 2

A second embodiment will be mentioned. The construction of the second embodiment is the same as that of the first embodiment shown in FIG. 2. The operation of the second embodiment is different in the operation of cell assembler 214 from that of the first embodiment. Only the cell assembler 214 will be described with reference to FIGS. 5 and 6.

Figure 5:
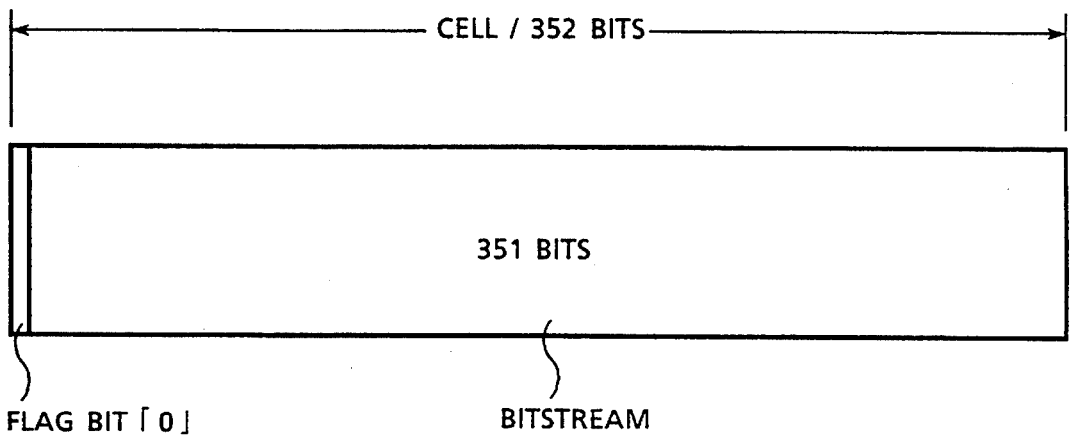
FIG. 5 is an explanatory diagram to which reference is made in explaining the operation of the cell assembler in the second embodiment of the invention.
Figure 6:
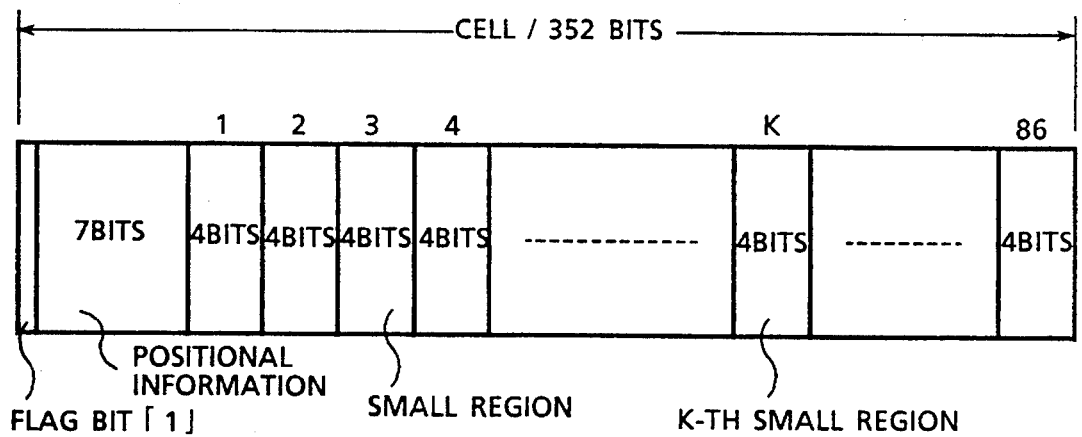
FIG. 6 is an explanatory diagram to which reference is made in explaining the operation of the cell assembler in the second embodiment of the invention.

The bitstream produced from the buffer is divided into cells of, for example, 352 bits each by the cell assembler as shown in FIG. 5. Of the 352 bits, the first bit is the flag bit which indicates whether the positional information is contained within the corresponding cell. If the flag is 0 (reset) as shown in FIG. 5, the positional information is not contained in the corresponding cell, and the 351 bits except the flag bit constitute the bitstream. If the flag bit is 1 (set) as shown in FIG. 6, the seven bits following the flag bit is the positional information. The remaining 344 bits constitute the bitstream. At the same time, the cell assembler 214 divides the bitstream of 344 bits into 86 small regions of, for example, 4 bits each, which are sequentially numbered as 1, 2, . . . , 86, respectively. When information of a certain pixel block begins from the K-th small region of a certain cell, K is expressed by a binary value of seven bits and added after the flag bit of the corresponding cell as the positional information. In this case, it is assumed that the information of a certain pixel block begins with the first bit of the K-th small region. If the information of a certain pixel block begins with another bit than the first bit of the K-th small region, for example, a bit of 1 is added thereat to shift one bit so that the information of a certain pixel block can be started from the first bit of the (K+1)-th small region as is similar to the first embodiment as shown in FIG. 4. Such bit shifting is performed so that the information of pixel block corresponds to the first bit of the region. Thus, since the pixel block information contains the positional information within the frame, it can be decoded from the pixel block. When there are two or more pixel blocks within one cell, the number of the small region which is closer to the beginning of the cell and in which the pixel block begins is added to the back of the flag bit that is positioned at the beginning of the cell. The cell-assembler properly sets or resets the flag bit to the transmission path in which a cell is lost or not.

Therefore, according to the second embodiment, since the number of the small region in which the information of a certain pixel block starts is added to the back of the flag bit as the positional information, the bitstream can be decoded beginning with the first appearing pixel block which follows the cell lost in the transmission path. Thus, the loss of information can be minimized. In the transmission path in which no cell is lost, only the flag bit is reset, or no positional information is added, and thus the transmission efficiency is not reduced.

While the positional information to be added to the beginning of the cell or the back of the flag bit is expressed by the number of the small region in which the information of a certain pixel block starts as in the first and second embodiments, it may be the number of the small region in which particular-meaning carrying information such as frame information and pixel information starts as well as the pixel block information.

Moreover, while the number of a small region is used to indicate the position of particular-meaning carrying information within a cell as in the first and second embodiments, the position of the particular-meaning carrying information within a cell may be indicated by other means.

According to this invention, as will be obvious from the embodiments, since the positional information of a plurality of bits is added within the corresponding cell so as to indicate the position of a particular-meaning carrying code word in a certain cell within the bitstream, the bitstream following the lost cell in the transmission path can be decoded beginning with the first appearing particular-meaning carrying code word. Thus, the loss of information can be minimized. In addition, since the information indicating whether the positional information of a particular-meaning carrying code word is added to within a cell is added to within the corresponding cell, the positional information of the particular-meaning carrying code word is not added within the cell in the transmission path in which no cell is lost and thus the transmission efficiency can be prevented from being reduced.

We claim:

1. A moving-image signal encoding apparatus comprising:

binary conversion means for converting an input image signal into a variable length binary signal;

bitstream conversion means for converting said binary signal into a bitstream;

cell conversion means for converting said bitstream into cells of a certain number of bits each; and cell assembler means for adding within said cells positional information of a plurality of bits which indicates the position of a particular-meaning carrying code word within said cells in said bitstream.

2. A moving-image signal encoding apparatus comprising:

binary conversion means for converting an input image signal into a variable length binary signal;

bitstream conversion means for converting said binary signal into a bitstream;

cell conversion means for converting said bitstream into cells of a certain number of bits each;

cell assembler means for adding within said cells positional information of a plurality of bits which indicates the position of a particular-meaning carrying code word within said cells in said bitstreams and for adding within said cells additional information which indicates the presence or absence of said positional information indicative of the position of said particular-meaning carrying code word contained within said cells in said bitstream.

3. The moving-image signal encoding apparatus according to claim 1, wherein said positional information is formed of seven bits.

4. The moving-image signal encoding apparatus according to claim 2, wherein said additional information is formed of one bit.

5. A moving-image signal encoding apparatus comprising:

an input terminal for receiving a digital moving-image signal as blocks within a current frame;

block position generator means for generating block position information indicative of the position of a block within the current frame, the block position information defining a spatial position where a block is positioned within the current frame;

frame memory means for storing frame data pixels of a previous frame;

motion vector detection means for receiving the digital moving-image input signal and producing a motion vector by comparing the current frame with the previous frame data pixels from the frame memory means;

prediction circuit means for receiving the motion vector from the motion vector detection means and previous frame data pixels from the frame memory means, and for producing an interframe prediction value with motion compensation based thereon;

subtraction means for receiving the digital moving-image input signal from the input terminal and the interframe prediction value from the prediction circuit means, and producing a prediction error value;

error encoding means for receiving the prediction error value from the subtraction means and encoding it into a prediction error code at each block;

source encoding means for receiving the prediction error code from the error encoding means, the block position information from the block position generator means, and the motion vector from the motion vector detection means, and making optimum information source encoding in accordance with appearance probabilities of the received data to thereby produce a variable length code;

buffer means for converting the variable length code from the source encoding means into a bitstream;

cell assembler means for dividing the bitstream from the buffer means into cells of bits, dividing the cells into a plurality of regions, and adding within each cell positional information indicating a region from which the information of a certain block begins; and channel encoding means for receiving the cells from the cell assembler means and outputting the cells on a transmission path.

6. The moving-image signal encoding apparatus according to claim 5, further comprising local decoding means for receiving the prediction error code from the error encoding means and decoding the prediction error code; and adding means for receiving the decoded prediction error code from the local decoding means and the interframe prediction value from the prediction circuit means, adding the decoded prediction error code and the interframe prediction value together to produce the previous frame data pixels, and storing the previous frame data pixels into the frame memory means.

* * * * *